Figure 10:
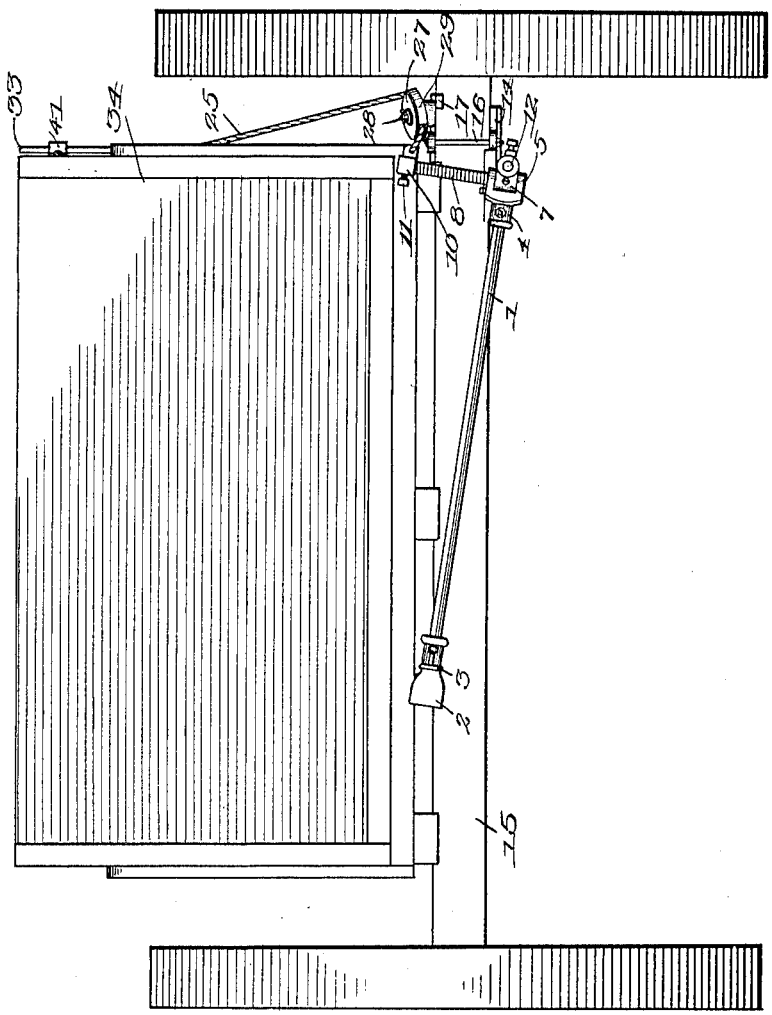

W. SIVERD.
WAGON BRAKE.
APPLICATION FILED JUNE 28, 1912.
1,066,854.
Patented July 8, 1913.
3 SHEETS—SHEET 1.
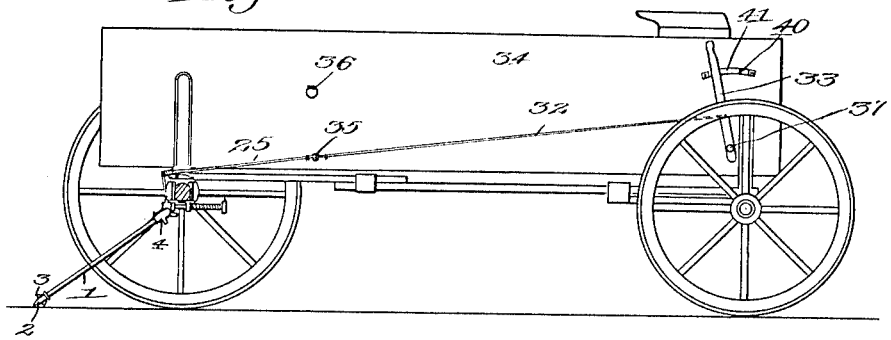
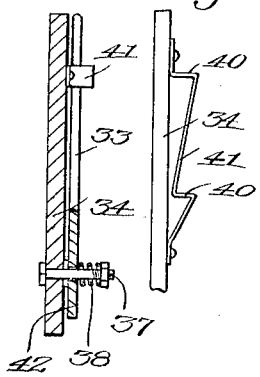
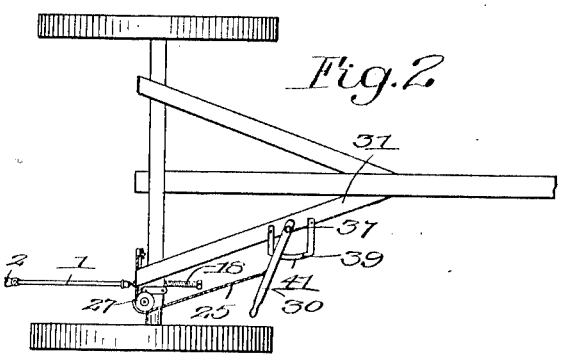
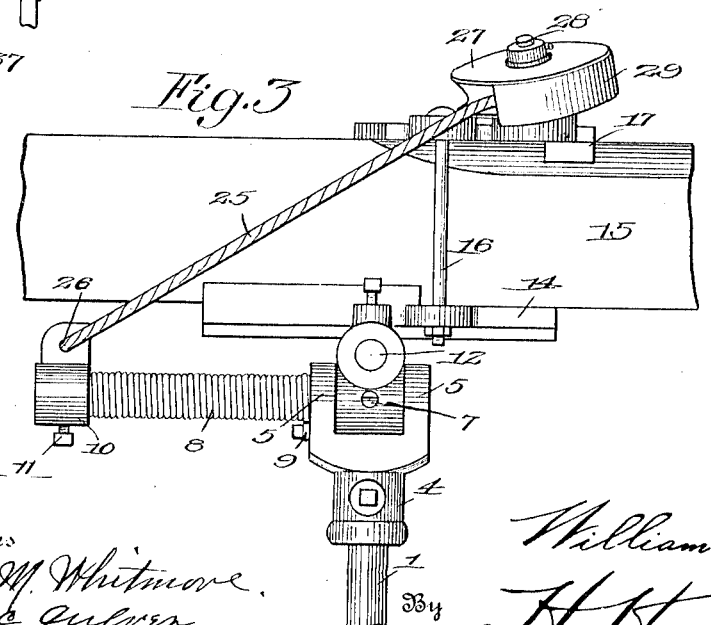

W. SIVERD.
WAGON BRAKE.
APPLICATION FILED JUNE 28, 1912.
1,066,854.
Patented July 8, 1913.
3 SHEETS—SHEET 2.
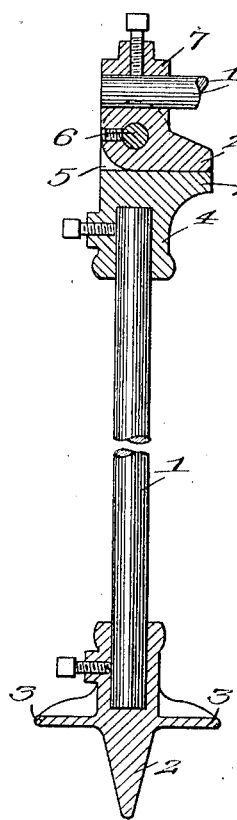
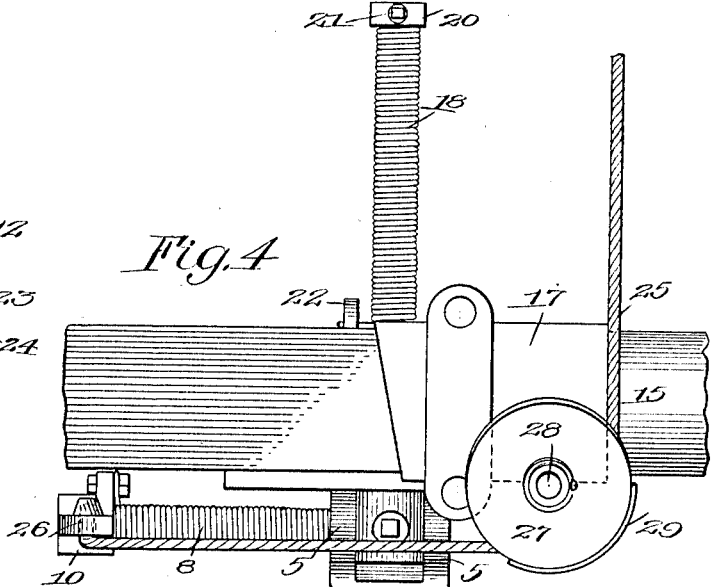
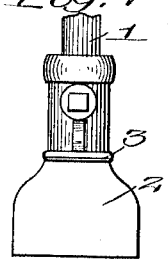
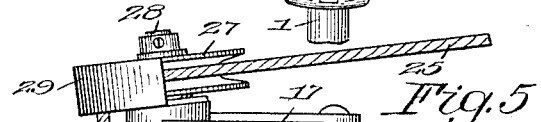
Witnesses
Ada M. Whitmore.
John C Cuern
Inventor
William Siverd
By H. H. Simms
Attorney

W. SIVERD.
WAGON BRAKE.
APPLICATION FILED JUNE 28, 1912.

1,066,854.

Patented July 8, 1913.

3 SHEETS—SHEET 3.

Witnesses
Ada M. Whitmore
John C. Culver

Inventor
William Siverd
By H. H. Simms
Attorney

UNITED STATES PATENT OFFICE.

WILLIAM SIVERD, OF GENESEO, NEW YORK, ASSIGNOR OF ONE-HALF TO WILLIAM A. WHEELER, OF AVON, NEW YORK.

WAGON-BRAKE.

1,066,854. Specification of Letters Patent. Patented July 8, 1913.

Application filed June 28, 1912. Serial No. 706,359.

*To all whom it may concern:*

Be it known that I, WILLIAM SIVERD, of Geneseo, in the county of Livingston and State of New York, have invented a new and useful Improvement in Wagon-Brakes, which improvement is fully set forth in the following specification and shown in the accompanying drawings.

The present invention relates to vehicle brakes and more particularly to that type which are constructed to permit the free forward movement of the vehicle but have a chucking action to prevent the rearward movement of the vehicle when ascending a hill, and an object of this invention is to provide a construction in which the chucking device may be moved to and from the chucking position by a person on the vehicle.

To these and other ends the invention consists in certain parts and combinations of parts all of which will be hereinafter described, the novel features being pointed out in the appended claims.

In the drawings: Figure 1 is a side view of a vehicle with the invention applied thereto; Fig. 2 is a top view of the rear portion of the vehicle showing the body removed with the chucking device connected to the supplemental operating lever; Fig. 3 is a detail enlarged view of the upper portion of the chucking device showing the manner in which the same is connected to the rear axle; Fig. 4 is a top view of the chucking device and the means for attaching the same to the rear axle; Fig. 5 is side view of the chucking device and its attaching means; Fig. 6 is a detail view, of the chucking device partially in section; Fig. 7 is a detail view of the penetrating point; Fig. 8 is a detail view of the controlling lever; Fig. 9 is a detail view of the lever retaining rack; and Fig. 10 is a rear view of a vehicle with the invention applied thereto and in raised position.

According to this invention, there may be provided a chucking element or device comprising a rod 1 having a penetrating point 2 removably or otherwise secured to one end of the rod and provided with oppositely extending wings 3 which act as stops to limit the penetration of the point 2. This chucking device is preferably secured to the vehicle so as to swing in a plane longitudinally and also in a plane transversely of the vehicle, the rod being of such length that, when it depends from its point of attachment, it will drag along the surface over which the vehicle is traveling, so that, on the rearward movement of the vehicle, the penetrating point will engage said surface and check such rearward movement. When the chucking device is moved transversely of the vehicle, it will swing upwardly to the inoperative position.

For accomplishing the above results, the rod 1 may be provided with a casting 4 which has ears 5 pivoted at 6 to a block or piece 7 so that the chucking device may swing longitudinally of the vehicle. The chucking device preferably has a normal tendency to swing forwardly at its lower end and, with this object in view, the pivot 6 is extended laterally from the block 7 and is surrounded by a helical spring 8 which is anchored at 9 to the casting 4 and has its other end secured to a collar 10 rigidly fixed to the pivot 6 by a set screw 11.

The block 7, to which the chucking device is secured, is provided with a pivot member 12 extending laterally and forwardly from said block 7 and turning in ears 13 which depend from a clamping plate 14 arranged on the under side of the rear axle 15 of the vehicle, the clamping plate being held in position by bolts 16 which are also anchored in a clamping plate 17 coöperating with the top of the axle, the clamping plates 14 and 17 with the bolts 16 providing the attaching means for the chucking device. The block 7 has a normal tendency to lie in such a position that the chucking device swings downwardly into operative position about the axis 12 and, to this end, a coil spring 18 surrounds the pivot 12 and has one end 19 secured to a collar 20 which in turn is rigidly secured to the pivot 12 by means of a set screw 21, the other end of the spring 18 being secured to a perforated ear 22 which extends laterally from one of the ears 13. It is apparent that, when the chucking device is swung laterally about the pivot 12, the spring 8 will act on the chucking device to swing the latter forwardly about the pivot 6, this forward movement being limited by abutments 23 and 24 secured respectively to the block 7 and the casting 4.

Any suitable means may be employed for swinging the chucking device about its axis 12. Preferably, a flexible connector 25 is secured to an ear 26 on the collar 10 and is passed about a pulley 27 to a suitable operating device to be described. The pulley 27 is preferably arranged on the axle 15 in proximity to one of the rear wheels, turning, in this instance, on a pivot 28 projecting upwardly from the clamping plate 17, said pivot being inclined rearwardly and toward one side of the vehicle away from the proximate wheel. An arcuate flange 29 may project upwardly from the plate 17 and conform to the periphery of the pulley 27, thus serving to hold the cable 25 within the groove of the pulley 27. The cable 25 may be connected directly to a lever 30 which is carried by the hounds 31 of the vehicle, or it may be connected, through the medium of an extension cable 32, with a lever 33 mounted on the wagon body 34, the cable extension 32 being detachably connected at 35 by a pair of snap hooks to the cable 25, so that these two cables may be disconnected when the wagon body 24 is removed. The snap hook on the end of the cable 32 is then secured to the eye 36 on the wagon body, while the snap hook on the cable 25 is secured to the lever 30. Both levers may be pivoted near one end on pivot pins 37 and which are elongated and surrounded by coil springs 38. Each spring 38 presses its lever 30 or 33 sidewise into coöperation with shoulders 39 or 40 on rack 41, the lever being moved to and from coöperation with the shoulder 39 or 40 by pressing laterally on the lever to compress the spring 38 and cause the end 42 of the lever to bear against a portion of the vehicle.

In the operation of this invention, the chucking device is normally held so that its point will not engage the ground, as shown in Fig. 10. As the vehicle reaches a hill to ascend the same, the lever 30 or 33 is actuated to lower the chucking device to the position shown in Fig. 1 so that the point 2 drags along the ground. Should the vehicle start to move backward down the hill, the point of the chucking device will penetrate the surface on which the vehicle is traveling and prevent the descent of the vehicle.

From the foregoing, it will be seen that there has been provided a brake of the type which checks the vehicle while ascending the hill, said brake being in the form of a chucking element penetrating the roadways and controllable from the vehicle to throw the said brake into an operative or an inoperative position. The chucking device has a movement for chucking action in the direction of the length of the vehicle, and a movement transversely into or out of operative position. The mechanisms for effecting these results are simple in operation, inexpensive to manufacture and not liable to get out of order.

What I claim as my invention and desire to secure by Letters Patent is:

1. In a vehicle brake, a chucking element adapted to drag along the surface on which the vehicle is traveling and having for this purpose a pivotal movement in the direction of the length of the vehicle and also having a pivotal movement transverse to the length of the vehicle to permit said element to be moved to an inoperative position, mechanism operable from the vehicle for swinging the chucking device transversely of the vehicle to an inoperative position and means for swinging said element forwardly in the direction of the length of the vehicle when said element is moved from operative position under the action of the aforesaid mechanism.

2. In a vehicle brake, a chucking element adapted to drag along the surface on which the vehicle is traveling and having for this purpose a pivotal movement in the direction of the length of the vehicle and also having a pivotal movement transverse to the length of the vehicle to permit said element to be moved to an inoperative position, mechanism operable from the vehicle for swinging the chucking device transversely of the vehicle to an inoperative position, and a spring acting to throw said element forwardly about its pivot when said element is moved from operative position under the aforesaid mechanism.

3. In a vehicle brake, an arm having its free end adapted to drag along the surface on which the vehicle is traveling, said arm having its opposite end pivoted so that said arm may swing in the direction of the length of the vehicle and also pivoted so that the arm may swing transversely of the length of the vehicle in order to permit the arm to be moved to an inoperative position, operating means for raising the free end of the arm about the last named pivot, and a spring for moving the arm forwardly about the other pivot as said arm is moved by said operating means.

4. In a vehicle brake, an arm having its free end adapted to drag along the surface on which the vehicle is traveling, said arm having its opposite end pivoted so that said arm may turn in the direction of the length of the vehicle and also pivoted so that the arm may swing transversely of the length of the vehicle to permit the arm to be moved to an inoperative position, operating means for raising the free end of the arm about the last named pivot, a spring for moving the arm forwardly about the other pivot as said arm is moved by said operating means, and a spring for moving the arm downwardly to operative position.

5. In a vehicle brake, the combination with a chucking element mounted to swing about two axes at right angles to each other, of springs for turning said chucking element about both of its axes, and means acting in opposition to one of the springs for shifting the chucking device about one of its axes to swing it in a plane transverse of the vehicle to an inoperative position.

6. In a vehicle brake, the combination with a suitable attaching means, of a chucking element mounted to swing on said attaching means about two axes at right angles to each other, springs each operating to swing the chucking element about one of the axes and means acting in opposition to one of the springs for shifting the chucking element about one of the axes, the other spring shifting the element about the other axis when said operating means is brought into operation.

7. In a vehicle brake, the combination with the chucking element, of a member to which said element is pivotally mounted, said member being also pivotally mounted, a spring interposed between the chucking element and the pivotally mounted member to move the chucking element forwardly on its pivot and in a plane in the direction of the length of the vehicle, a spring interposed between the pivotally mounted member and its support to move said pivotally mounted member together with the chucking element downwardly about the axis of turning of the pivotally mounted member and in a plane transverse of the length of the vehicle and means for swinging the support and the chucking element around the last named axis against the action of the spring.

8. In a vehicle brake, the combination with a member mounted to swing on the vehicle about an axis extending longitudinally of the vehicle, of a chucking element pivotally mounted on said pivotally mounted member to swing about an axis extending transversely of the axis of the pivotally mounted member, and means for shifting the pivotally mounted member about its axis.

9. In a vehicle brake, the combination with an attaching member having a bearing thereon, of a pivotally mounted member having a pivot rod adapted to turn in said bearing about an axis extending longitudinally of the vehicle, a spring surrounding said pivot rod secured at one end thereto and at the other end to the attaching member, a pivot rod carried by the pivotally mounted member and extending transversely thereof, a chucking element adapted to turn on the pivot rod near one end of the latter, a coil spring surrounding said pivot and secured at one end to said rod and at the other end to the chucking element, and operating means connected to the last mentioned rod.

10. In a vehicle brake, the combination with a member mounted to turn about an axis extending longitudinally of the vehicle, of a chucking element pivotally mounted on said member to turn about an axis extending transversely of the length of the vehicle, a spring acting on the chucking element to move the free end of the latter forwardly as said free end is elevated, a spring acting on said pivoted member to move the latter in one direction about its axis, a flexible connection secured to said pivotally mounted member to move the latter against the action of the last mentioned spring, and an operating member for said flexible connection.

11. In a vehicle brake, the combination with a chucking element mounted to turn about two axes, one extending longitudinally of the vehicle and the other extending transversely of the vehicle, springs for moving said chucking element about both axes, and a flexible connection connected to the chucking element to swing the latter about the axis extending longitudinally of the vehicle against the action of one of the springs, permitting the other spring to move the chucking element about the other axis when the latter is swung by means of the flexible connection.

12. In a vehicle brake, the combination with the attaching means, of a member mounted to swing on the attaching means about an axis extending longitudinally of the vehicle, a spring for moving said member in one direction, a chucking element mounted to swing on the said member about an axis extending transversely of the length of the vehicle, a spring for moving said chucking element forwardly about said axis, a flexible connection connected to the member to swing the latter about its axis in order that the chucking element will be raised, a pulley carried by the attaching means and having the flexible connection passed about the same, and a lever to which the flexible connection is secured.

WILLIAM SIVERD.

Witnesses:
H. H. SIMMS,
ADA M. WHITMORE.

---

Copies of this patent may be obtained for five cents each, by addressing the "Commissioner of Patents, Washington, D. C."